United States Patent
Hinkel et al.

[11] Patent Number: 6,079,529
[45] Date of Patent: Jun. 27, 2000

[54] TORQUE CONVERTER

[75] Inventors: Rüdiger Hinkel, Röthlein; Christoph Sasse, Schweinfurt, both of Germany

[73] Assignee: Mannesmann Sachs AG, Schweinfurt, Germany

[21] Appl. No.: 09/273,380

[22] Filed: Mar. 22, 1999

[30] Foreign Application Priority Data

Mar. 23, 1998 [DE] Germany ............................ 198 12 686

[51] Int. Cl.⁷ .................................................. F16D 33/00
[52] U.S. Cl. ........................ 192/3.26; 192/3.28; 192/3.29; 192/3.3
[58] Field of Search .................................. 192/3.28, 3.29, 192/3.3, 3.31, 3.26; 74/572, 574; 477/171, 176, 168

[56] References Cited

U.S. PATENT DOCUMENTS

| | | | |
|---|---|---|---|
| 3,747,436 | 7/1973 | Hause ...................................... | 192/3.26 |
| 4,018,106 | 4/1977 | Uozumi et al. . | |
| 4,673,071 | 6/1987 | Moroto et al. .......................... | 192/3.21 |
| 5,004,082 | 4/1991 | Sakakibara et al. .................... | 192/3.26 |
| 5,020,646 | 6/1991 | Koshimo ................................ | 192/3.25 |

FOREIGN PATENT DOCUMENTS

| | | | |
|---|---|---|---|
| 0 200 335 | 3/1986 | European Pat. Off. ........ | F16H 45/02 |
| 0 308 072 | 8/1988 | European Pat. Off. ........ | F16H 45/00 |
| 0 787 932 | 7/1995 | European Pat. Off. ........ | F16H 61/14 |
| 2 398 231 | 7/1977 | France ........................... | F16H 41/18 |
| 2 535 002 | 4/1984 | France ........................... | F16H 45/02 |
| 964798 | 2/1961 | United Kingdom . | |
| 2 163 230 | 2/1986 | United Kingdom .......... | F16D 43/284 |
| 2 287 513 | 9/1995 | United Kingdom ........... | F16H 59/24 |

*Primary Examiner*—Charles A. Marmor
*Assistant Examiner*—Tisha D. Waddell
*Attorney, Agent, or Firm*—Cohen, Pontani, Lieberman & Pavane

[57] ABSTRACT

A torque converter comprises a converter housing having a converter cover and an impeller wheel. The converter housing is connectable to a driving unit. A turbine wheel arranged in the converter housing is rotatably mounted for rotating about an axis of rotation with respect to the converter housing. The turbine wheel has a turbine wheel shell and a turbine wheel hub. The turbine wheel hub is connectable to a converter driven shaft. The turbine wheel shell is selectively connectable to the turbine wheel hub for connection with respect to rotation via a first coupling arrangement.

16 Claims, 2 Drawing Sheets

FIG.1       CONTROLLER

TORQUE CONVERTER

BACKGROUND OF THE INVENTION

1. Field of the Invention

The present invention is directed to a torque converter having a converter housing that is connectable to a driving unit, an impeller wheel fixedly connected to the converter housing, a turbine wheel arranged in the converter housing and rotatable with respect to the converter housing about an axis of rotation and having a turbine wheel shell and a turbine wheel hub that is connectable with a converter driven shaft.

2. Description of the Related Art

In automotive engineering, a torque converter is frequently used in connection with automatic transmissions. A problem exists in prior art torque converters in that power loss is generated when the vehicle is stationary and the engine is running because an impeller wheel which is driven by the converter housing delivers a work fluid provided inside the converter to the turbine wheel and a stator wheel. In these prior art devices, the turbine wheel is connected directly to the output shaft. Since the vehicle is held still by brakes, the power loss is generated by the stator rotating against a turbine wheel that is held still. In a known solution which prevents the generation of power loss, a clutch is installed between the driving unit and torque converter which completely separates the converter and the gear unit connected following the converter from the driving unit when the vehicle is stationary. A problem with this solution is that the converter housing and the components which are fixedly connected therewith generally form a flywheel mass for the engine and therefore facilitate a quiet and true running of the engine. Uncoupling the converter housing, and accordingly the entire converter, from the driving unit may result in rough or out-of-true running of the engine especially in the low speed ranges of the engine.

Another known solution is to provide a clutch which separates the torque converter from the gear unit connected downstream of the torque converter. In this solution, the torque converter remains coupled with the driving unit in the lower speed range such, for example, as when the vehicle is stationary. To prevent the rough running of the unit, the turbine wheel in this case must carry along the entire mass of those components connecting the torque converter to the clutch. Since a clutch of this kind is generally arranged at the input side of the transmission, the transmission input shaft is rotated with the turbine wheel. This configuration results in a power loss because the torque converter and the additional mass of the transmission shaft must be rotated.

In hydrodynamic torque converters, an unchangeable converter characteristic is predetermined by the given vane geometry of the turbine wheel vanes on the one hand and of the impeller vanes on the other hand. This converter characteristic is generally designed for optimum performance in the warm operating state of the engine or of the gear oil. When starting in the cold state, the engine can be loaded so highly due to an overly hard design of the impeller that the engine can no longer run up to speed correctly or runs out-of-true. There is even a risk that the engine will stall. A possible solution to this problem is a configuration of vane geometry that is a compromise between cold running behavior and warm running behavior. However, this compromise has the disadvantageous effect that when the unit is running in the warmed-up condition the inherent transmission capacity of the converter is not utilized causing an increase in fuel consumption.

SUMMARY OF THE INVENTION

It is the object of the present invention to provide a torque converter in which the generation of power loss can be substantially completely prevented especially in the stationary state of the vehicle and in which a disadvantageous effect on a driving unit during warm running can be prevented while nevertheless retaining very good transmission characteristics in the warm running state.

According to the invention, this object is met by a torque converter comprising a converter housing connectable to a driving unit, and a turbine wheel arranged in the converter housing and rotatable with respect to the converter housing about an axis of rotation, wherein the turbine wheel has a turbine wheel shell and a turbine wheel hub that is connectable with a converter driven shaft. The torque converter according to the invention is further provided with a first coupling arrangement that selectively connects the turbine wheel hub with the turbine wheel shell with respect to rotation.

Due to the fact that the first coupling arrangement can be engaged or disengaged in a selectable manner, the power flow through the torque converter is interruptable immediately following the turbine wheel shell. When the vehicle is stationary, for example, the first coupling arrangement is disengaged so that there is essentially no rotational connection between the turbine wheel shell and turbine wheel hub. In this state, fluid continues to be delivered into the turbine wheel shell by the impeller wheel. However, no power loss is generated because the turbine wheel shell need not move any additional components and it is rotated at substantially the same speed as the impeller wheel. Moreover, since the turbine wheel hub may be uncoupled from the transmission input shaft immediately after starting the engine when the engine and gear oil are still cold, only the turbine wheel hub with the vanes carried thereon is set in rotation by the fluid delivered into the turbine wheel by the impeller wheel vanes and no torque is transmitted to additional components. That is, in the cold state in which the output torque of the engine is relatively low, the engine is not additionally loaded by having to transmit torque to any components arranged in the drivetrain downstream of the torque converter. The engine may accordingly be run up to speed without load and can warm up quickly. If the engine is allowed to heat up to a minimum operating temperature, the clutch may then be engaged in a controlled manner. That is, the slip in the clutch can be steadily reduced, so that the turbine which initially rotates along freely is decelerated and is coupled, for example, to the transmission input shaft for torque transmission.

In the torque converter according to the present invention, the first coupling arrangement may comprise at least one friction element at one component and a counter friction element at another component. In a preferred embodiment, the components are the turbine wheel shell and turbine wheel hub. The first coupling arrangement also includes a contact pressure element at the turbine wheel shell and/or turbine wheel hub, wherein the at least one friction element and the at least one counter-friction element are pressed against one another by the contact pressure element for producing the rotational connection between the turbine wheel hub and turbine wheel shell.

An arrangement which is easy to control is achieved when the contact pressure element is provided in a cylindrical receiving space at the turbine wheel hub. The contact pressure element is movable in the cylindrical receiving space preferably approximately in the axial direction for producing or for cancelling the rotational connection. In this case, the contact pressure element is essentially not movable with respect to the turbine wheel hub in the circumferential direction about the axis of rotation.

For selective engagement or disengagement of the first coupling arrangement, the contact pressure element substantially seals the receiving space in a preferred embodiment such that a blind end of the receiving space is tight against fluid. This arrangement forms a fluid chamber in the receiving space which can communicate with a fluid pressure source for movement of the contact pressure element.

Since the first coupling arrangement is arranged in a radial inner region of the connection between the turbine wheel shell and the turbine wheel hub, it is suggested for producing a sufficient torque transmission engagement of the first coupling arrangement that two friction elements are provided at one component, which friction elements are displaceable with respect to one another in the axial direction and are connected with the one component so as to be essentially fixed with respect to rotation relative to it. In this embodiment, a counter-friction element which projects between the two friction elements is connected with the other component so as to be fixed with respect to rotation relative to it.

Preferably, one component is the turbine wheel shell and the other component is the turbine wheel hub.

The achievable coupling engagement can be strengthened in that the friction element and the counter-friction element can be pressed against one another with the intermediary of friction facings.

When driving at a relatively high and constant speed the function of the torque converter as such is usually not needed. However, since at least slight power losses are generally always generated by the torque transmission through a work fluid, it is advantageous for the torque converter to further comprise a second coupling arrangement by means of which the turbine wheel is selectively connectable for rotation with the converter housing. That is, when this second coupling arrangement is brought into an engaged state a direct rotational connection is produced from the converter housing to the turbine wheel hub. The torque transmission path is essentially bypassed via the work fluid in this operation state.

To damp rotational vibrations occurring in a drive system, it is suggested that the turbine wheel shell be rotationally connected via a torsional vibration damper with the converter housing by the second coupling arrangement.

Alternatively, the turbine wheel hub is optionally rotationally connected with the converter housing via a torsional vibration damper, by the second coupling arrangement.

Further, a controller is preferably associated with the torque converter according to the invention for controlling/regulating the engagement force of the first coupling arrangement and, if required, of the second coupling arrangement. The two coupling arrangements can preferably be controlled/regulated independently from one another by the controller.

The present invention is further directed to a process for controlling/regulating the engagement force of a first coupling arrangement and of a second coupling arrangement in a torque converter, wherein the first coupling arrangement is provided in the power flow path between a turbine wheel shell and a turbine wheel hub and the second coupling arrangement is provided in the power flow path between a converter housing and the turbine wheel shell. In particular, the process is provided for controlling/regulating slip between an input side and an output side of the torque converter to a reference slip value in a bridged or bypass state. The process according to the invention comprises the following steps:

a) determining an actual slip value based on the rate of rotation at the input side and the rate of rotation at the output side of the torque converter;

b) determining a reference slip value to be provided for a bypass state;

c) controlling/regulating the second coupling arrangement in a substantially fully engaged, slip-free engagement state of this coupling arrangement;

d) controlling/regulating the engagement force of the first coupling arrangement in such a way that the actual slip value of the torque converter is changed in the direction of the reference slip value and/or is maintained in the range of the reference slip value.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
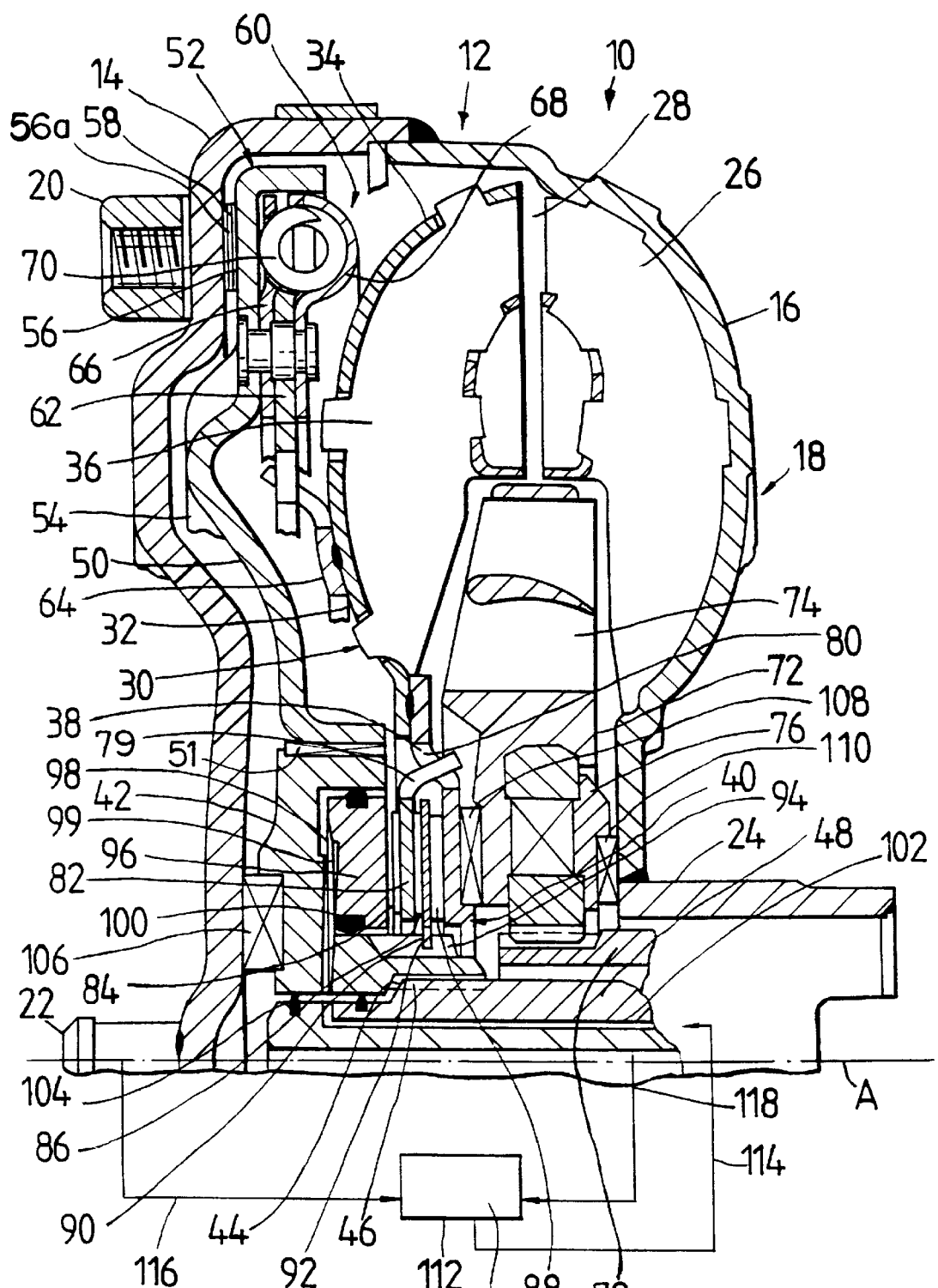
FIG. 1 is a partial longitudinal sectional view through a torque converter according to an embodiment of the present invention.

FIG. 1 shows a torque converter 10 according to the present invention having a converter housing 12 which substantially includes a cover 14 and an impeller shell 16 of an impeller wheel 18. The radial outer area outer area of the cover 14 has a plurality of coupling elements 20 which may be used via a flexible plate or the like to couple the cover 14 of the torque converter 10 to a drive shaft of a driving unit such, for example, as an internal combustion engine. The radial inside of the cover 14 is fixedly connected to a cover hub 22 which may be rotatably mounted, for example, in the drive shaft of the driving unit.

The radial inside of the impeller shell 16 is connected to an impeller hub 24 which is constructed in a manner known per se for a driving connection with a work fluid pump, i.e., an oil pump or the like. A plurality of impeller vanes 26 are arranged successively in the circumferential direction in the impeller shell 16.

A turbine wheel 30 is arranged in an interior 28 of the torque converter 10. The turbine wheel 30 has a turbine wheel shell 32 constructed in two parts in the present embodiment form. A radial outer part 34 of the turbine wheel shell 32 has a plurality of turbine vanes 36 arranged successively in the circumferential direction and a radial inner part 38 of the turbine wheel shell 32 forms a component of a coupling arrangement 40 in a manner which will be described hereinafter. The radial inner part 38 is substantially fixedly connected with the radial outer part 34, for example, by welding, The turbine wheel shell 32 is selectively connectable with a turbine wheel hub 42 for joint rotation via the coupling arrangement 40. The turbine wheel hub 42 has an inward facing axial toothing 44 which engages with a complementary outward facing axial toothing 46 of a converter driven shaft 48 to transmit torque from the turbine wheel hub 42 to the converter driven shaft 48 and into the further drivetrain.

A piston 50 of a second coupling arrangement or a lockup clutch 52 is mounted on the radial outer area of the turbine wheel hub 42. The piston 50 is mounted such that it is essentially freely rotatable with respect to the turbine wheel hub 42. A fluid-tight support connection 51 is provided between the piston 50 and the turbine wheel hub 42 for separating the fluid in the converter interior 28 from a pressure space 54 formed at the other axial side of the piston 50. For example, the fluid tight support section 51 may comprise a sliding bearing, a roller body bearing with additional sealing, or the like. If the pressure in the converter interior 28 is increased, a friction surface 56 of the piston 50 is pressed against a counter-friction surface 58 at the cover 14 in a manner known per se, so that the piston 50 and cover 14, which is part of the converter housing 12, are connected so as to be fixed with respect to relative rotation.

In this case, a friction element 56a may be provided in the area of the cover 14 and/or in the area of the piston 50 to strengthen the frictionally engaging connection. When the piston 50 is frictionally engaged with the cover 14, the torque which is then introduced from the housing 12 to the piston 50 is transmitted to the turbine wheel shell 32 via a torsional vibration damper 60, more specifically, by a hub disk 62 of the torsional vibration damper 60. A toothing of the hub disk 62 is in meshed engagement with a complementary toothing of a driver part 64 which is fixedly connected to the turbine wheel shell 32. The torsional vibration damper 60 is constructed in a manner known per se. It has a hub disk 62 and cover disk elements 66, 68 on both sides of the hub disk 62. A damping spring arrangement 70 acts between the hub disk 62 and the cover disk elements 66, 68. The cover disk elements 66, 68 are connected with the piston 50 of the lockup clutch 52 so that the cover disk elements are fixed with respect to rotation relative to the piston. The torque can be transmitted directly from the converter housing 12 to the turbine wheel shell 32 by the torsional vibration damper 60 in the bypass state accompanied by damping of the rotational vibrations occurring in the drive train.

It can further be seen that a stator wheel 72 which likewise has a plurality of stator vanes 74 is provided axially between the turbine wheel 30 and the impeller wheel 18 and is rotatably supported radially inside of the impeller wheel 18 on a support shaft 78 via a freewheel 76.

On the turbine wheel side, the coupling arrangement 40 includes the radial inner part 38 of the turbine wheel shell 32 and a friction element 82. Projections 79 on the friction element 82 engage corresponding recesses 80 of the turbine wheel shell 32. The friction element 82 is accordingly held at the turbine wheel shell 32 so as to be fixed with respect to rotation relative to it, but is displaceable in the axial direction of an axis of rotation A with respect to the radial inner part 38 of the turbine wheel shell 32 due to the construction of the projections 79 and recesses 80 which engage with one another. Friction facings 84, 86, 88 may be provided at the friction element 78 on one side and at the radial inner part 38 of the turbine wheel shell 32 on the other side. For this purpose, a radial inner portion of the radial inner part 38 of the turbine wheel shell 32 is substantially flat.

A counter-friction element 90 is connected with the turbine wheel hub 42 so as to be fixed with respect to rotation relative to it. The counter-friction element 90 has a toothing 92 in meshed engagement with an axial toothing 94 provided at the turbine wheel hub 42, such that the counter-friction element 90 is displaceable in the axial direction of the axis of rotation A with respect to the turbine wheel hub 42 and extends radially outward from the turbine wheel hub 42 between the friction elements 86, 88 at the friction element 82 and radial inner part 38 of the turbine wheel shell 32.

A cylindrical recess 98 in the turbine wheel hub 42 extends annularly around the axis of rotation A and receives a contact pressure element 96 of the coupling arrangement 40. The radial inner side of the contact pressure element 96 engages in the axial toothing 94 and is accordingly held so as to be fixed with respect to rotation relative to the turbine wheel hub 42. The contact pressure element 96 is supported via sealing rings 100 or another type of sealing element at a radial outer wall and a radial inner wall of the cylindrical recess 98. The contact pressure element 96 tightly seals the inner side or blind end of the cylindrical recess 98 such that a fluid pressure chamber 99 is formed between the blind end and the contact pressure element 96. The fluid pressure chamber 99 is in communication with a fluid line 102 extending through the converter driven shaft 48 and the turbine wheel hub 42. For this purpose, sealing rings 104 or some other type of sealing elements are arranged at the transition between the converter driven shaft 48 and the turbine wheel hub 42 to provide a fluid-tight connection transition between the converter driven shaft 48 and the turbine wheel hub 42. The contact pressure element 96 can be pressed toward the right, with reference to FIG. 1, by supplying fluid under pressure to the fluid pressure chamber 99, so that the contact pressure element 96 presses against the friction facing 84 at the friction element 82. The counter-friction element 90 is clamped between the friction facings 86, 88 via this pressing action. In this case, an axial support is provided on the one hand by an axial bearing 106 by which the turbine wheel hub 42 is supported axially at the radially inner area of the cover 14 and, on the other hand, by an axial bearing 108 by which the radially inner part 38 of the turbine wheel shell 32 is supported in the axial direction at the stator wheel 72. The stator wheel 72 is supported in turn via an axial bearing 110 at the impeller wheel 18. It will be seen that an axial projection or a plurality of axial projections forming a radial centering for the bearing 108 is provided at the radially inner portion of the radial inner part 38 of the turbine wheel shell 32.

The torque converter according to the invention functions in the following manner:

In a stationary state of a vehicle outfitted with the torque converter 10 according to the invention in which no torque is to be transmitted from the driving unit to the driving wheels the coupling arrangement 40 is in a disengaged state. This means that no work fluid under pressure is introduced via the line 102 into the fluid pressure chamber 99, so that the contact pressure element 96 does not press the friction element 82 against the counter-friction element 90. In this state, there is essentially no rotational coupling formed between the turbine wheel shell 32 and the turbine wheel hub 42. Since the converter housing 12 is connected with the driving unit so as to be fixed with respect to rotation relative to it and also rotates with the shaft of the driving unit when the vehicle is in the stationary state, oil is introduced into the interior 28 of the converter 10 by the oil pump connected with the impeller wheel hub 24. Due to the oil pressure which builds up in this case, the work fluid is delivered to the turbine vanes 36 by the impeller vanes 26 and by the vanes 74 of the stator wheel. As a result, the turbine wheel 30 is also rotated. However, since the turbine wheel 30 is not connected to additional masses, a speed ratio in the range of 1 takes place between the impeller wheel 18 and turbine wheel 30 in this state. Also, the stator wheel 72 is rotated in this state in the same direction as the impeller wheel 18 and the turbine wheel 30. Since all three components—impeller 18, stator 72 and turbine 30—rotate in the same rotational direction, there are no so-called mixing losses between the impeller wheel 18 and stator wheel 72 or between the stator wheel 72 and turbine wheel 30. When driving commences, which can be detected, for example, by actuation of a gas pedal, a controlling/regulating device, such as controller 112 in FIG. 1, controls a fluid pressure source or releases a fluid valve, as indicated by an arrow 114, so that fluid under pressure is introduced into the fluid pressure chamber 99 via the line 102. In this respect, the pressure built up in the chamber 99 must be greater than the pressure prevailing in the converter interior 28 to press the contact pressure element 96 to the right, with reference to FIG. 1, and therefore to move the coupling arrangement 40 into an engaged state. Since this pressure difference is required, a separate line 102 for supplying fluid to the fluid chamber 99 and, if necessary, a separate fluid pressure source are also required.

If the coupling arrangement 40 is in its engaged state, the transmission of torque through the torque converter 10 is possible in a manner known per se, i.e., via the turbine wheel 30 to the converter driven shaft 48. Any axial play present in the converter is eliminated by the closing coupling arrangement 40 and the feedback or reverse-coupling of force generated in this respect via the impeller shell 16 and the cover 14 and axial bearings 106, 108 and 110. Further, the closing of the coupling arrangement 40 ensures that there is always the same axial distance between the impeller wheel 18 and the turbine wheel 30 regardless of the operating state, i.e., pull operation or push operation.

If it has been detected that the vehicle has stopped again, the fluid supply to the fluid chamber 99 can be interrupted or the line 102 can be opened to an outlet, respectively, by means of the controller 112, so that the force pressing the contact pressure element 96 against the friction element 82 is overcome and the coupling arrangement 40 is moved into its disengaged state. In this case, it can be ensured, for example, that the contact pressure element 96 is guided back by the counter-pretensioning element toward the left, with reference to FIG. 1, into the recess 98 in a compulsory manner.

Therefore, the generation of power loss in the stationary state of a vehicle is prevented with the torque converter according to the invention because only the turbine wheel shell 32 is driven in rotation and additional masses need not be driven. Moreover, the torque converter 10 according to the invention has an advantage in the adjustment of a bypass state. The bypass state occurs, for example, when driving at a constant, relatively high speed in which a direct torque transmission coupling is provided between the converter housing 12 and the turbine wheel hub 42 while bypassing the work fluid as driving means. Generally, this is performed by engaging the lockup clutch 52, so that a fixed connection with respect to rotation is produced between the torque converter housing 12 and the turbine wheel 30. In some driving states, it may also be desirable to allow a determined slip in the torque converter 10 in the bypass state in the form of a determined difference of the speed at the input side and the speed at the output side. That is, the slip is a difference between the rate of rotation of the converter housing 12 and the rate of rotation of the converter driven shaft 48. In conventional torque converters, this is accomplished by controlling the engagement force of the lockup clutch 52 such that the detected actual slip corresponds to the permissible or desired reference slip. However, since this produces a difference in speed between the impeller wheel 18 and the turbine wheel 30, the so-called mixing losses occur again in the hydraulic circuit.

In contrast to the conventional torque converter, the torque converter 10 according to the invention is operable such that the occurrence of mixing losses of this type is prevented also in the bypass state while providing a desired slip between the input side of the converter and the output side of the converter. This is done in the following manner: First, it is assumed that in accordance with certain preselected parameters, such, for example, as the driving speed, the controller 112 detects that a bypass state exists. That is, the controller 112 detects a direct torque transmission connection between the converter housing 12 and the converter driven shaft 48 by bypassing the work fluid as driving means. The speed is then determined or detected at the input side of the converter as is indicated by an arrow 116. In a corresponding manner, a speed is detected or determined at the driven side of the converter as is indicated by an arrow 118. The two speeds are compared with one another in the controller 112 and an actual slip value is accordingly determined. The actual slip value can be determined, for example, by taking the ratio of the output speed to the input speed or by substraction of the input speed and output speed. However, it is essential in this respect that a value is obtained which is in direct relationship to the speed difference between the input side and the output side. Further, the controller 112 determines a reference slip value based on the bypass state.

The controller 112 then compares the reference slip value with the actual slip value. In accordance with the comparison results, the two coupling arrangements 40 and 52 are controlled in such a way that the actual slip value is brought closer to the reference slip value or is maintained in a determined permissible range of deviation around the reference slip value. For this purpose, the controller 112 moves the lockup clutch 52 into its fully engaged state, in which there is no difference in speed between the cover 14 of the converter housing 12 and the piston 50 of the lockup clutch 52. The controller 112 then controls an amount of fluid directed toward the coupling device 40 by suitably controlling a fluid pressure source communicating with the line 102 or by suitably controlling a valve arranged in this line such that the desired approximation of the actual slip value to the reference slip value is achieved. The engagement force of the coupling arrangement 40 is regulated in such a way that the slip occurring in the coupling arrangement 40, i.e., the speed difference between the turbine wheel shell 32 and the turbine wheel hub 42, is equal to the slip value corresponding to the reference slip value. The total slip occurring and desired in the torque converter is generated in the range of the coupling arrangement 40. The result of this control arrangement is that the turbine wheel shell 32 with the turbine vanes 36 supported thereon can rotate at the same speed as the impeller wheel 18. As a result, the occurrence of mixing losses in the torque converter is prevented.

If it is detected that the bypass state is to be canceled, the engagement state of the lockup clutch 52 is completely disengaged, and the coupling arrangement 40 is put into its completely engaged state by the controller 112 to operate the torque converter 10 in a conventional manner.

It is noted that a determined slip may also be adjusted in the disengaged state of the lockup clutch 52 in the area of the coupling arrangement 40.

In this embodiment form and in this process for operating a torque converter, the lockup clutch 52 is only operated as a separating clutch, i.e., as a clutch which is switched back and forth only between its engaged and its disengaged state. The desired slip is then adjusted by corresponding operation of the coupling arrangement 40 connecting the turbine wheel shell 32 with the turbine wheel hub 42.

Since the coupling arrangement 40 need not simultaneously carry out the function of a seal during its normal operation and in the bypass state, as is the case in the area of the lockup clutch 52, the friction facings and friction surfaces of the coupling arrangement 40 may be adapted to the occurring torque transmission requirements in an optimum manner, for example, by providing grooves in the friction facing or the like. The friction facings used in the lockup clutch 52 and/or in the coupling arrangement 40 may be formed, for example, of paper material, carbon-containing material, sintered material or the like. As was already mentioned, structures in the form of grooves, bore holes or the like can be provided in any shape in these facings.

The constructional type of the coupling arrangement 40 illustrated above serves only as an example. Thus, it is also possible to couple a plurality of counter-friction elements 90 with the turbine wheel hub 42 so as to be fixed with respect to rotation relative to one another and, in a corresponding manner, to provide a plurality of friction elements 82 coupled with the turbine wheel shell 32, so that a sandwich type construction results. Similarly, it is possible, for example, to provide at least one of the friction facings 86 and 88 at the counter-friction element 90 rather than at the friction element 82 or at the radial inner part 38 of the turbine wheel shell 32. The friction facing 84 of the friction element 82 may also be provided at the contact pressure element 96. The contact pressure element 96 can be constructed as a ring piston element, wherein the recess 98 is also to be constructed as an annular recess in this case. However, it is also possible to provide individual contact pressure element portions, i.e., individual piston elements which succeed one another in the circumferential direction and are received in separate recesses and are each controlled separately by fluid lines.

Figure 2:
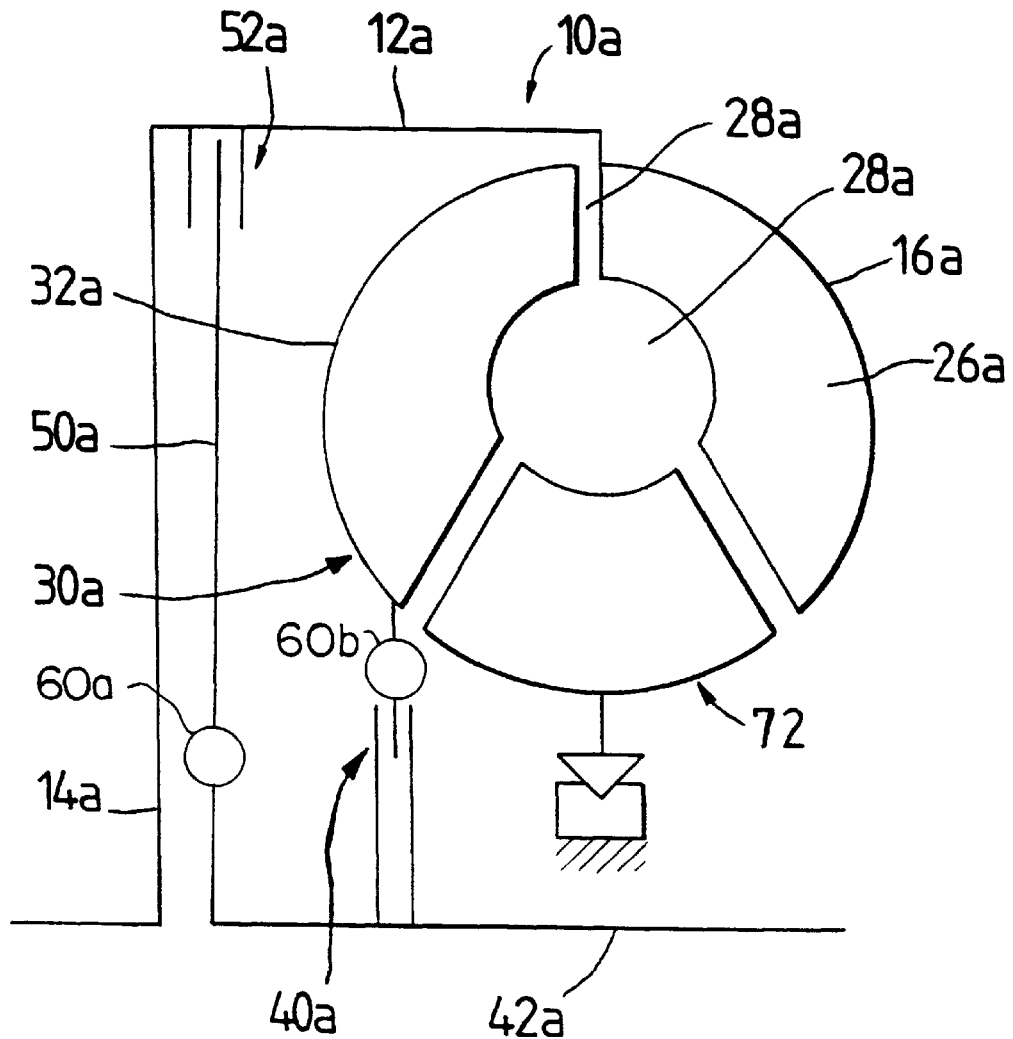
FIG. 2 is a schematic view showing an alternative embodiment form of the torque converter of the present invention.

FIG. 2 is a schematic diagram of an alternative embodiment of the present invention. Structural component parts corresponding to the structural component parts described above with reference to FIG. 1 are designated by the same reference numbers with the addition of the letter "a". The following description only addresses the differences in construction compared with the construction according to FIG. 1.

The torque converter 10*a* of FIG. 2 has a coupling arrangement 40*a* between the turbine wheel shell 32*a* and the turbine wheel hub 42*a*, wherein the turbine wheel shell 32*a* and turbine wheel hub 42*a* can be connected so as to be fixed with respect to rotation relative to one another to a varying extent, as desired, by the coupling arrangement 40*a*. This has the above-mentioned advantages with regard to prevention of power loss during idling when the vehicle is stationary and makes it possible to bring an engine driving the torque converter, for example, an internal combustion engine, to operating temperature initially following a cold start and to engage the coupling arrangement 40*a* for torque transmission only when a minimum operating temperature has been reached.

In the embodiment form according to FIG. 2, a second coupling arrangement, i.e., a lockup clutch 52*a*, is provided by which the torque converter can be bypassed in the bypass state. That is, when the lockup clutch 52*a* is engaged, the housing 12*a* and turbine wheel hub 42*a* are connected with one another so as to be fixed with respect to rotation relative to one another. In the embodiment form shown in FIG. 2, however, the two coupling arrangements 40*a* and 52*a* are connected in parallel with respect to the turbine wheel hub 42*a*. Accordingly, the torque is transmitted either via the coupling arrangement 40 during torque conversion or is transmitted by the clutch 52*a* in the bypassed state. To permit a determined slip in the bypass state, the coupling arrangement 52*a* must be controlled in a corresponding manner.

It is possible to arrange an optional torsional vibration damper 60*b* in the power flow between the turbine wheel shell 32*a* and the turbine wheel hub 42*a* and/or our optional torsional vibration damper 60*a* in the power flow between the lockup clutch 52*a* and the turbine wheel hub 42*a*, so that torsional vibrations occurring in the drivetrain can be damped in the torque conversion state as well as in the bypass state.

The invention is not limited by the embodiments described above which are presented as examples only but can be modified in various ways within the scope of protection defined by the appended patent claims.

We claim:

1. A torque converter, comprising:

a converter housing connectable to a driving unit and including an impeller wheel, said converter housing being rotatable about an axis of rotation;

a turbine wheel arranged in said converter housing and rotatable relative to said converter housing about said axis of rotation, said turbine wheel having a turbine wheel shell and a turbine wheel hub connectable to a converter driven shaft; and a first coupling arrangement operatively connected between said turbine wheel shell and said turbine wheel hub for selectively connecting said turbine wheel hub to said turbine wheel shell with respect to rotation.

2. The torque converter of claim 1, wherein said first coupling arrangement comprises:

a friction element at one of said turbine wheel shell and said turbine wheel hub and a counter-friction element at the other one of said turbine wheel shell and said turbine wheel hub; and a contact pressure element operatively connected to one of said friction element and said counter-friction element for selectively pressing said one of said friction element and said counter-friction element against the other one of said friction element and said counter-friction element for producing a rotational connection between a turbine wheel hub and said turbine wheel shell.

3. The torque converter of claim 2, wherein said turbine wheel hub comprises a cylindrical receiving space for movably receiving said contact pressure element, said contact pressure element being axially movable toward and away from said turbine wheel shell, in said cylindrical receiving space for, respectively, producing and canceling the rotational connection between said turbine wheel hub and said turbine wheel shell and said contact pressure element being rotatably fixed with respect to said turbine wheel hub.

4. The torque converter of claim 3, wherein said contact pressure element substantially seals a receiving space in a blind end of said cylindrical receiving space such that it is tight against fluid and said receiving space forms a fluid chamber connectable with a fluid pressure source for controlling movement of said contact pressure element.

5. The torque converter of claim 2, wherein said friction element comprises two friction elements displaceable with respect to one another in the axial direction and fixed with respect to rotation relative to said one of said turbine wheel shell and said turbine wheel hub, and wherein said counter-friction element projects between said two friction elements and is fixed with respect to rotation relative to said other one of said turbine wheel shell and said turbine wheel hub.

6. The torque converter of claim 2, wherein said one of said turbine wheel shell and said turbine wheel hub comprises said turbine wheel shell and the other one of said turbine wheel shell and said turbine wheel hub comprises said turbine wheel hub.

7. The torque converter of claim 5, further comprising friction facings between each of said two friction elements and said counter-friction element such that said friction facings are intermediate said friction elements and said counter-friction element when said two friction elements are pressed against said counter friction element.

8. The torque converter of claim 1, further comprising a second coupling arrangement arranged between said turbine wheel and said converter housing for selectively connecting said turbine wheel to said converter housing.

9. The torque converter of claim 8, wherein said turbine wheel shell is rotatably connectable to said converter housing via said second coupling arrangement.

10. The torque converter of claim 9, further comprising a torsional vibration damper operatively connected between said turbine wheel shell and said second coupling arrangement.

11. The torque converter of claim 8, wherein said turbine wheel hub is connectable with said converter housing via said second coupling arrangement.

12. The torque converter of claim 9, further comprising a torsional vibration damper operatively connected between said turbine wheel hub and said second coupling arrangement.

13. The torque converter of claim 1, further comprising a controller operatively connected to said first coupling arrangement for controlling/regulating an engagement force of said first coupling arrangement.

14. The torque converter of claim 13, further comprising a second coupling arrangement arranged between said turbine wheel and said converter housing for selectively connecting said turbine wheel to said converter housing, wherein said controller is operatively connected to said second coupling arrangement.

15. The torque converter of claim 8, further comprising a controller operatively connected to said first coupling arrangement for controlling an engagement force of said first coupling arrangement and operatively connected to said second coupling arrangement for controlling an engagement force of said second coupling arrangement, wherein said controller is operatively connected for independently controlling said first coupling arrangement and said second coupling arrangement.

16. A process for controlling a slip between an input side and an output side of the torque converter to a reference slip value in a bypass state of the torque converter by controlling an engagement force of a first coupling arrangement and a second coupling arrangement in the torque converter, wherein the first coupling arrangement is arranged in a first power flow path between a turbine wheel shell and a turbine wheel hub and the second coupling arrangement is arranged in a second power flow path between a converter housing and the turbine wheel shell, the process comprising the following steps:
 a) determining an actual slip value by comparing a measured rate of rotation at the input side and a measured rate of rotation at the output side of the torque converter;
 b) determining a reference slip value for a bypass state;
 c) controlling the second coupling arrangement such that said second coupling arrangement is in a substantially fully engaged, slip-free engagement state; and
 d) controlling the engagement force of the first coupling arrangement for one of changing the actual slip value toward reference slip value and maintaining the actual slip value in the tolerance range of the reference slip value.

* * * * *